United States Patent [19]
Thuru

[11] Patent Number: 6,152,349
[45] Date of Patent: Nov. 28, 2000

[54] WELDING MOLD AND PREHEATING DEVICE INTENDED TO COOPERATE WITH THE WELDING MOLD

[75] Inventor: Jean-Jacques Thuru, Saint Amand-les-Eaux, France

[73] Assignee: Railtech International, Raismes, France

[21] Appl. No.: 09/101,257

[22] PCT Filed: Jan. 2, 1997

[86] PCT No.: PCT/FR97/00002

§ 371 Date: Jul. 6, 1998

§ 102(e) Date: Jul. 6, 1998

[87] PCT Pub. No.: WO97/25479

PCT Pub. Date: Jul. 17, 1997

[30] Foreign Application Priority Data

Jan. 5, 1996 [FR] France .................................. 96 00086

[51] Int. Cl.[7] .......................... B23K 31/02; B23K 37/00; B22D 11/00; E01B 11/44
[52] U.S. Cl. ...................... 228/44.3; 228/4.1; 228/234.3; 164/469; 164/470; 104/15
[58] Field of Search .................................... 228/4.1, 44.3, 228/49.1, 234.3; 164/47, 469, 470, 508; 104/15

[56] References Cited

U.S. PATENT DOCUMENTS

| | | | |
|---|---|---|---|
| 3,684,003 | 8/1972 | Funk | 164/362 |
| 4,190,228 | 2/1980 | Bommart | 249/86 |
| 4,247,074 | 1/1981 | Stratmann et al. | 249/86 |
| 4,413,169 | 11/1983 | Cameron | 219/73.1 |
| 4,429,207 | 1/1984 | Devletian et al. | 219/73.1 |
| 4,841,116 | 6/1989 | Kimura et al. | 219/73.1 |
| 5,151,202 | 9/1992 | Bommart | 249/86 |
| 5,175,405 | 12/1992 | Karimine et al. | 219/54 |
| 5,419,484 | 5/1995 | Radulescu | 228/234.3 |
| 5,515,904 | 5/1996 | Radulescu | 164/54 |
| 5,531,259 | 7/1996 | Kuster | 164/54 |
| 5,605,283 | 2/1997 | Lahnsteiner et al. | 238/164 |

FOREIGN PATENT DOCUMENTS

| | | |
|---|---|---|
| 599274 | 7/1990 | Australia . |
| 369304 | 12/1982 | Austria . |
| 373187 | 12/1983 | Austria . |
| 1146153 | 11/1957 | France . |
| 2374127 | 7/1978 | France . |
| 2396620 | 2/1979 | France . |
| 358525 | 9/1922 | Germany . |
| 223040 | 11/1942 | Switzerland . |

*Primary Examiner*—Patrick Ryan
*Assistant Examiner*—Kiley Stoner
*Attorney, Agent, or Firm*—Levine & Mandelbaum

[57] ABSTRACT

The present invention concerns a welding mold for butt welding two metal parts by casting a molten filler metal in an imprint defined by a mold. At least one of the components of the mould includes a spacer member shaped and sized so that it can be engaged in a gap between the two parts only if the latter have a mutual separation at least equal to a specific mutual separation, so as to allow the mutual assembly of the components of the mold around the parts to be welded only on this condition. Applications include the welding of railway rails, concrete reinforcing rods and metal bars.

10 Claims, 4 Drawing Sheets

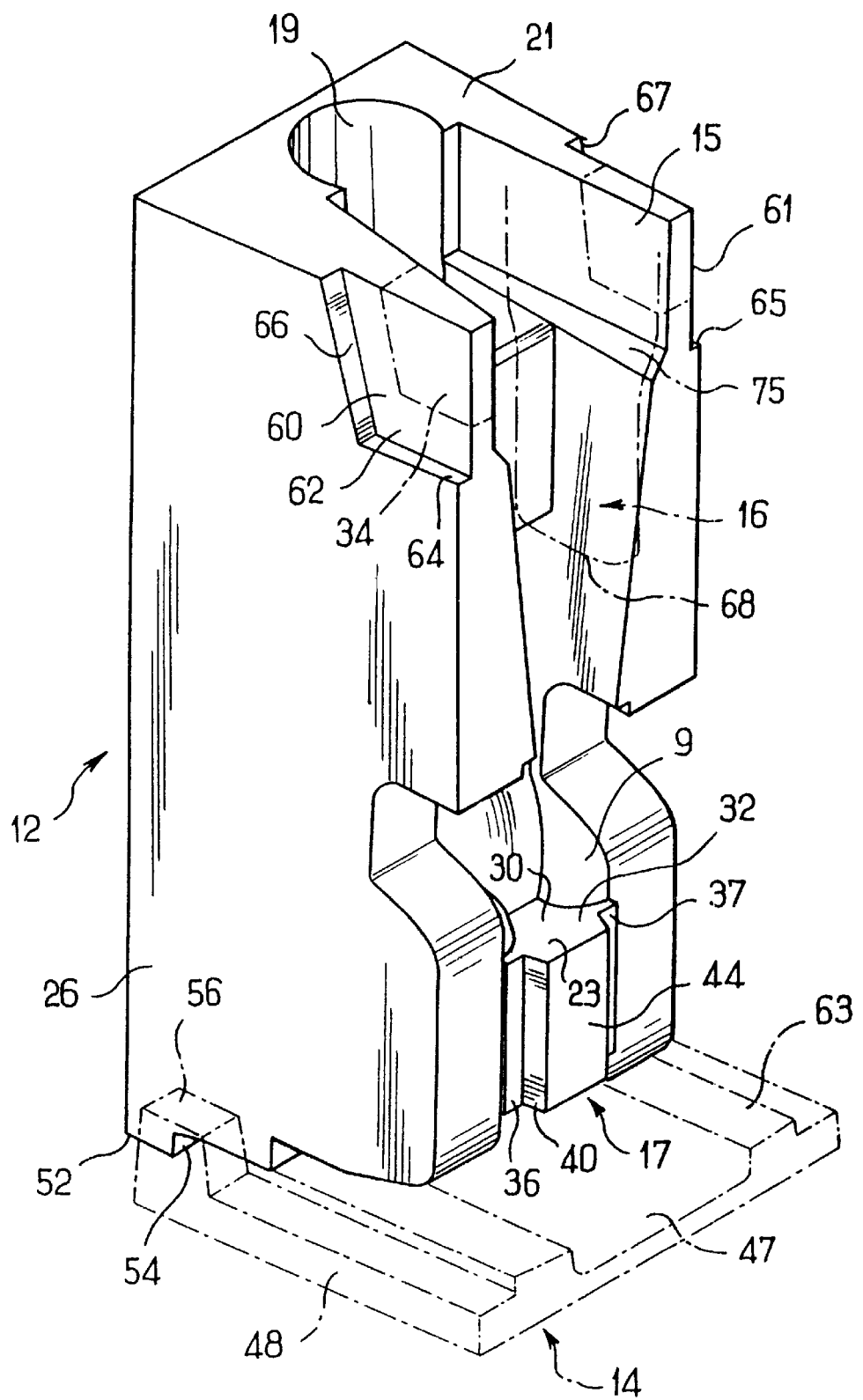
FIG_1

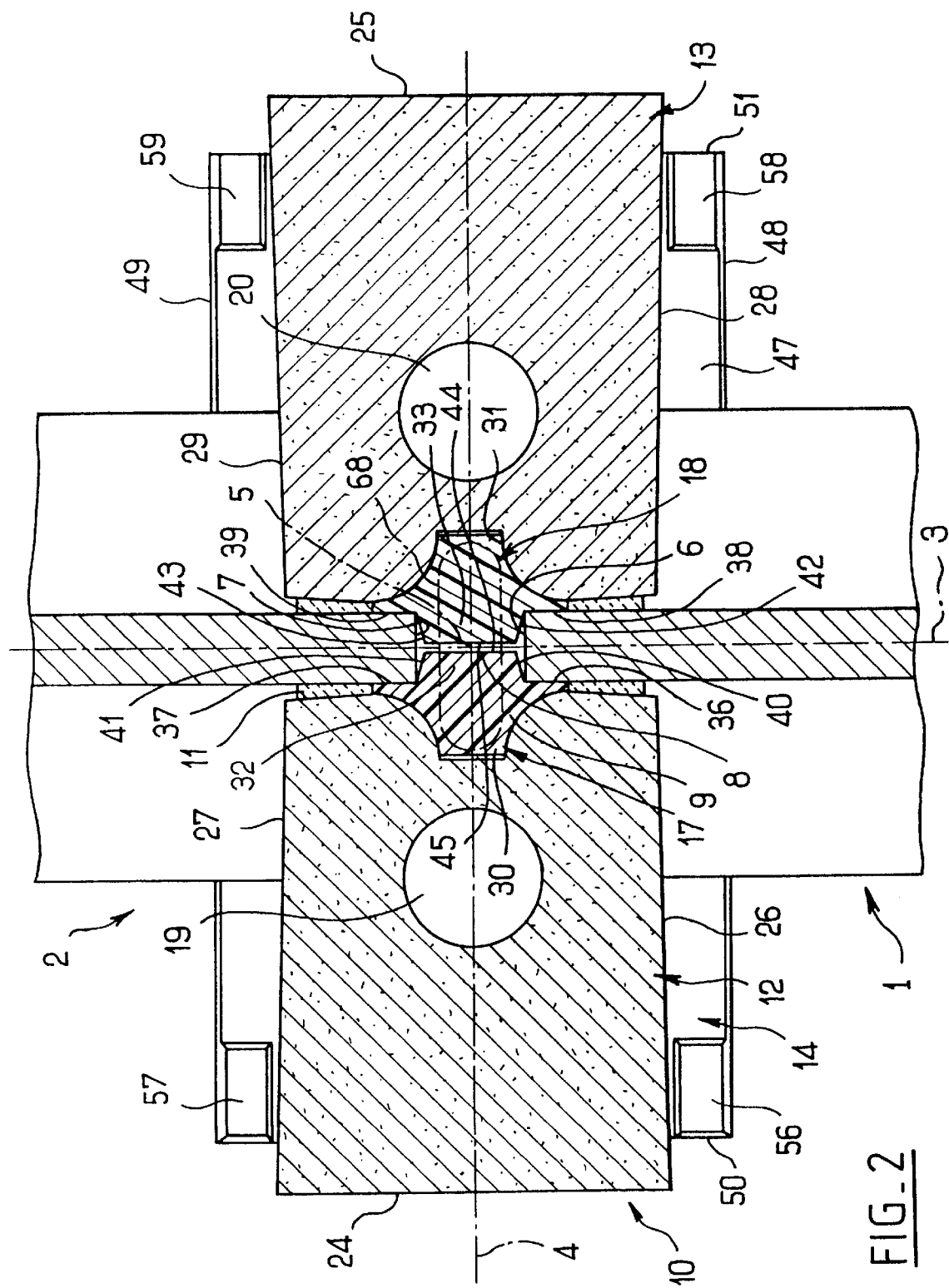
FIG_2

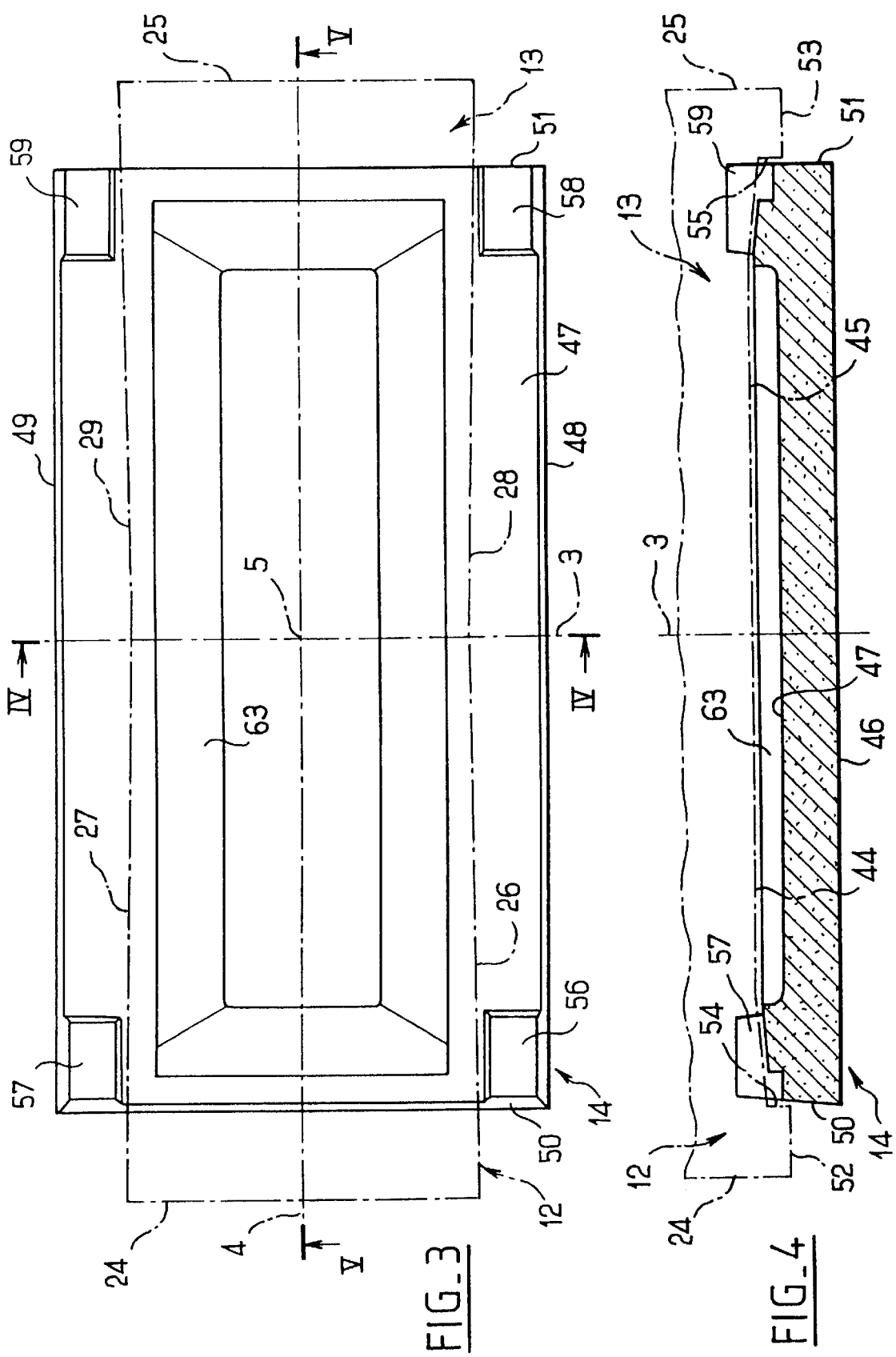

WELDING MOLD AND PREHEATING DEVICE INTENDED TO COOPERATE WITH THE WELDING MOLD

The present invention concerns a welding mold for butt-jointing two metal parts, such as railway rails, having a specific mutual separation to define a gap between them, said mold comprising a plurality of refractory material components adapted to be assembled together to nest locally with the two parts and to complement each other so as to delimit with them, around said space, a molding imprint adapted to receive a molten filler metal.

The molten filler metal is generally obtained by aluminothermic reaction and molds of this kind are used to butt weld diverse metal parts, usually bars of constant or approximately constant cross-section, namely not only railway rails but also concrete reinforcing rods, metal beams, etc.

Experience of this method of welding indicates that, for the quality of the weld, it is important for the gap between the ends of the parts to be welded to have a specific dimension with certain tolerances. If the gap is too large, the volume of filler metal is insufficient to fill it entirely, although this defect is obvious when the mold is opened, so that it is evident that the weld must be done again; however, if the gap is too narrow, the defect is not visible and is not detected until a later time, after the railway track or other structure is put into use, in the form of a fault that must be repaired urgently.

What is more, the welding molds currently available on the market, in particular for aluminothermic welding of rails, can be placed in a position such that they are not correctly centered relative to the gap, which means that any pre-heating of the rail end pieces or other metal parts followed by their heating by the filler metal are effected under different conditions, compromising the homogeneity of the weld.

The aim of the present invention is to remedy these drawbacks and, to this end, the present invention proposes a mold of the type indicated in the preamble characterized in that at least one of said components of the mold includes, inside the imprint, at least one spacer member shaped and sized so that it can be engaged in said gap if the two parts have a mutual separation at least equal to said specific mutual separation, in order to enable nesting of said component over the two parts in a specific relative position and the mutual assembly of said components of the mold and such that it cannot be engaged in said gap if the two parts have a mutual separation less than said specific mutual separation, in order to prohibit the nesting of said component over the two parts in said specific relative position and the mutual assembly of said components, said spacer members being made from a material that degrades without producing residues likely to degrade the weld at a specific temperature lower than the melting point of the parts.

A person skilled in the art will readily understand that the presence of the spacer members when the components of the mold are assembled around the end portions of the metal parts to be welded prevents their assembly if the gap between them is too small, i.e. if the welding defect caused by failure to comply with the specific mutual separation would not be immediately visible on opening the mold, it being understood that too large a mutual separation of the end portions of the parts remains possible but has less serious consequences since the defect is immediately visible and can therefore be remedied immediately.

When the spacer member can enter the gap between the end portions of the parts to be welded, and when the separation of the latter conforms to the specific mutual separation corresponding to a weld of good quality, with a permissible tolerance, the spacer member not only does not oppose the assembly of the parts of the mold, but also, by engaging between the end portions of the parts to be welded, assures centering of the assembled mold so that it is certain that the two end portions will be treated identically during any pre-heating and during welding, i.e. to assure the homogeneity of the weld.

The shape of the spacer member can naturally be chosen, depending on the shape of the parts to be assembled, so that it fulfils its functions optimally, and in particular the centering function. When the parts to be assembled are railway rails, the spacer member can advantageously be made to enter the gap between the rails at the level of the stem of the latter, by appropriate positioning in the corresponding part of the imprint of the mold, and mates with this gap over a large proportion of its dimension between the flanges of the rails and the heads of the rails, which assures accurate positioning of the mold not only in terms of centering it but also in terms of its orientation relative to the rails, naturally when the gap is just sufficient to enable penetration of the centering member, which corresponds to compliance with the specific mutual separation between the rail ends.

The specific temperature of degradation of the spacer member is preferably less than a specific temperature of pre-heating of the parts within the imprint prior to introduction of the molten filler metal into the latter. Accordingly, if the end portions of the parts to be assembled are pre-heated before the filler metal is introduced between them, the spacer member is eliminated during this pre-heating, the residues being removed from the imprint with the hot gases generated by the pre-heating. This prevents the residues from coming into contact with the molten filler metal when the latter is introduced into the molding imprint, which would entail the risk of compromising the quality of the weld.

Expanded polystyrene is one non-limiting example of a heat-degradable material that can be satisfactorily used to make the spacer member.

When, as is the case with molds for welding railway rails, the components of the mold comprise two lateral shells mutually symmetrical about a mutual mating plane adapted to coincide with a median plane common to the two parts in said specific relative position, each of the lateral shells advantageously has one such spacer member, which reinforces the effect of constituting an obstacle to the assembly of the components of the mold if the gap between the end portions of the parts to be welded is too small and improves the accuracy with which the mold is located relative to the parts.

When the components of the mold comprise at least one top member, which may be formed of the two lateral shells previously mentioned, and at least one bottom member underlying the top member, in particular a baseplate, the bottom member may be incorrectly positioned relative to the top member even if the latter is correctly positioned relative to the gap, with the risk of leakage of the molten filler metal. To avoid this drawback, in one preferred embodiment of the present invention, the top member and the bottom member have mutual nesting means in a specific relative position, for example in the form of recesses and raised patterns having shapes and positions such that they cooperate to this end, as will be evident to a person skilled in the art.

In the conventional way, the mold of the invention generally has a pouring bush opening at the top onto the outside of the mold and at the bottom into the imprint, for introducing the molten filler metal into the latter. When the end portions of the parts to be welded are pre-heated before the introduction of the filler metal, this pre-heating is effected by means of a device such a pre-heater burner or torch, for example, which is introduced downwardly into the pouring bush after assembling the mold and which must be positioned virtually identically relative to both end portions of the parts to be welded so that these end portions are pre-heated under known and substantially identical conditions, which is necessary to obtain a homogeneous bond to the filler metal.

To assure as accurate as possible location of the pre-heater device relative to the end portions of the two parts to be welded in the imprint prior to the introduction of the molten filler metal into the latter, there is advantageously provision for the mold to include specific positioning means for the pre-heater device. Because the characteristic features of the mold in accordance with the invention previously described assure accurate location of the mold relative to the end portions of the parts to be welded, this accurate positioning of the pre-heater device relative to the mold assures accurate positioning of the pre-heater device relative to the parts to be welded, i.e. in practice its centering relative to the gap between the latter.

The means for positioning the pre-heater device relative to the mold can be of various kinds but the insertion of the pre-heater device and its removal after introduction of the filler metal are particularly simple if, as in a preferred embodiment, the positioning means include, on respective sides of the pouring bush, outside the mold, a bearing surface in which a respective bearing surface of complementary shape on the pre-heater device nests downwardly.

When the latter is in the form of a pre-heater burner or torch, it s inevitably fitted with a feed tube that is generally rigid and at right angles to the burner, and the presence of this tube must be compatible with that of various items of equipment in the immediate proximity of the welding mold; accordingly, for the same position of the pre-heater device proper relative to the gap between the end portions of the parts to be welded, the device can preferably be nested with the mold with a plurality of different orientations of its feed tube.

To this end, the nesting bearing surfaces on respective opposite sides of the pouring bush are advantageously identical, mutually symmetrical about a first plane and respectively symmetrical about a second plane perpendicular to the first plane, one of the first and second planes being adapted to coincide with a median plane common to the two parts in said specific relative position and the other of the first and second planes being adapted to coincide with a median plane of said gap in said specific relative position.

The respective shapes of the nesting bearing surfaces may be varied provided that they are compatible with the method of fabricating the mold and with the latter's mechanical features.

Nevertheless, in one preferred embodiment, which is even compatible with the construction of a sand mold, each of the nesting bearing surfaces on respective opposite sides of the pouring bush has a flat back facing towards the outside of the mold and in the shape of an isosceles trapezium with the narrower side at the bottom, the two backs being parallel to each other and overlapping the second plane, and shoulders flanking the back at the bottom and in the direction away from the second plane, on respective opposite sides of the latter, whereas the back is open at the top.

To cooperate with a mold having nesting bearing surfaces conformed in this manner, the present invention proposes a pre-heater device, such as a pre-heater burner or torch including a heater member, such as a gas outlet nozzle, adapted to be engaged downwardly in the pouring bush and to be placed at the intersection of the first and second planes, characterized in that it includes two plates each of which has a trapezoidal shape substantially identical to that of the back of a nesting bearing surface formed on the mold, and means for placing the two plates on respective opposite sides of the heater member, in a relative position such that they are mutually parallel, respectively symmetrical about a median plane of the heater member adapted to coincide with the second plane, mutually symmetrical about another median plane of the heater member adapted to coincide with the first plane, and mutually spaced by a distance substantially identical to the mutual spacing of the backs of the nesting bearing surfaces formed on the mold.

This mutual nesting is therefore sure to obtain correct positioning of the pre-heater device in all directions relative to the imprint of the mold, i.e. relative to the end portions of the parts to be welded.

To facilitate fitting of the pre-heater device to the mold and its subsequent removal, one of the plates is advantageously fastened to the heater member and thereby serves as a reference for mounting on the mold when it is engaged in one of the nesting bearing surfaces of the latter and the other plate is joined to the heater member through means for adjusting its separation from the first plate. In this case, the pre-heater device is fitted to the mold with a distance between the adjustable plate and the fixed plate greater than the distance between the backs of the nesting bearing surfaces provided on the mold; then, after locating the fixed plate in the corresponding nesting bearing surface, the adjustable plate is moved towards it until it engages in the other nesting bearing surface provided on the mold. Before removing the pre-heater device from the mold, the adjustable plate can be moved away from the fixed plate again to facilitate this operation.

Other features and advantages of a mold and of a pre-heater device of the invention will emerge from the description given hereinafter with reference to one non-limiting example and to the accompanying drawings, which constitute an integral part of that description.

The drawings all relate to the aluminothermic butt welding of two railway rails, but a person skilled in the art will readily be able to modify the arrangements to be described to adapt them to welding concrete reinforcing rods, bars of various kinds or other metal parts to be butt welded by pouring molten filler metal.

FIG. 1 shows a perspective view of a top half-mold or shell of a mold for aluminothermic butt welding of two railway rails, this top half-mold being provided with a spacer member in accordance with the present invention.

FIG. 2 shows a view of the mold assembled around end portions of rails to be welded, in section on a plane parallel to the rolling plane of the rails, at the level of the stem of the latter, each of the two top half-molds being provided with a spacer member in accordance with the present invention.

FIG. 3 shows a view of a bottom mold part, or baseplate, complementing the two top half-molds to close the bottom of the molding imprint around the two end portions of the rails to be welded.

FIGS. 4 and 5 show a view of this bottom mold part in two mutually perpendicular planes IV—IV and V—V, respectively, in FIG. 3.

FIG. 6 shows the co-operation, in accordance with a preferred embodiment of the present invention, between a pre-heater device and the top part of the mold, formed by the two half-molds, to assure accurate positioning of the pre-heater device relative to the end portions of the two rails to be welded.

Figures 5, 6:
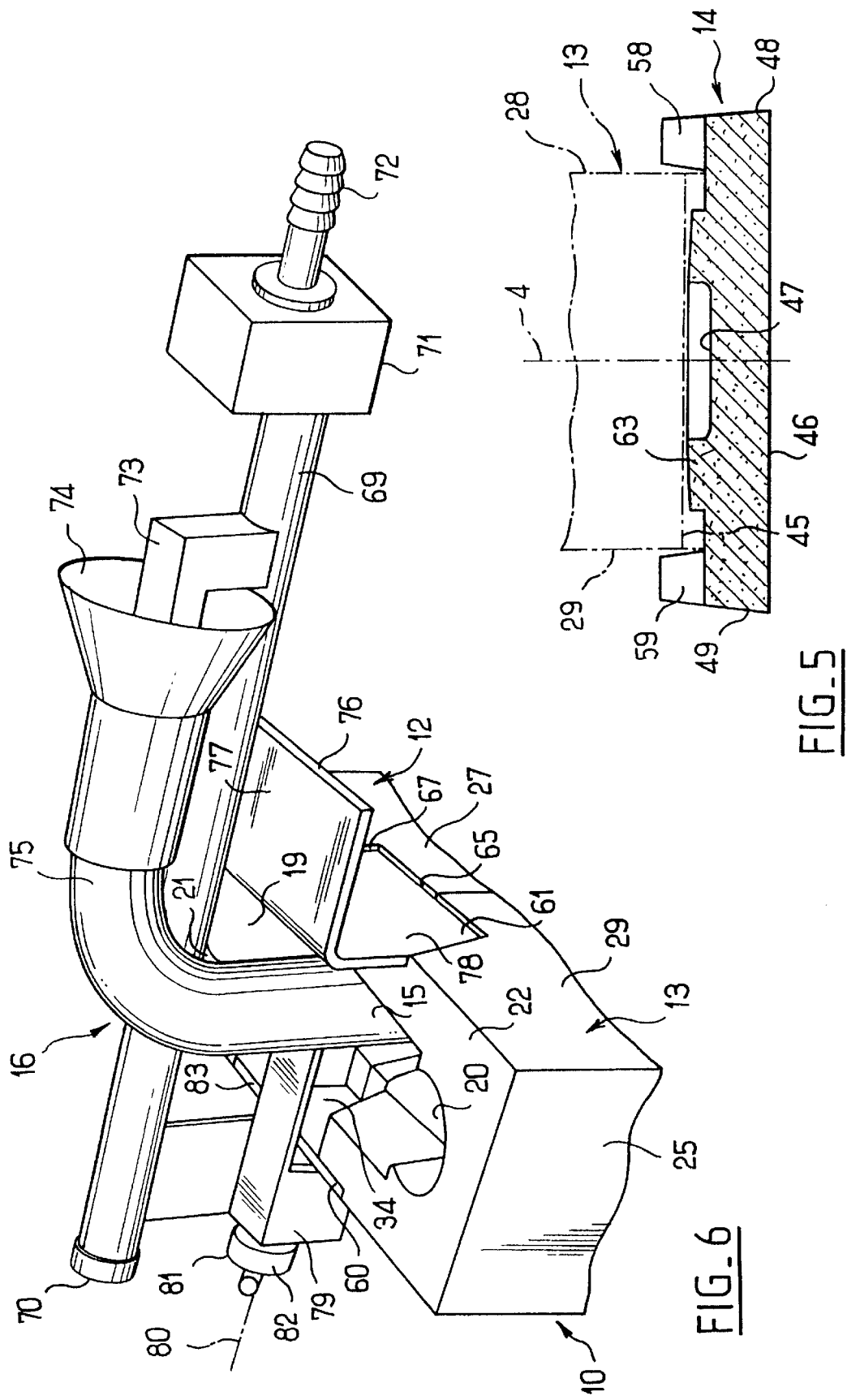

Two railways rails 1 and 2 are straight or can be considered to be locally straight will be assumed to be horizontal for reasons of convenience of description, without this implying any limitation as to the possibilities of application of the present invention. The two rails are aligned with each other so that they have a common median plane of symmetry 3, assumed to be vertical in this non-limiting example, and are disposed symmetrically to each other about another median plane 4 that is also assumed to be vertical, intersecting the plane 3 along a vertical axis 5. The two rails 1 and 2 therefore have respective plane end faces 6, 7, parallel to the plane 4, mutually symmetrical about the latter plane and facing each other so that a space 8 remains between them that can be filled with a filler metal, obtained by aluminothermic action, to butt weld the two rails 1 and 2 together.

To this end, and in a manner that is known in itself, the space 8 and the respective areas of the rails 1 and 2 immediately adjacent the end faces 6 and 7 of the latter are housed inside an imprint 9 of a mold 10 which, in the example shown, constitutes a version improved in accordance with the present invention of the mold sold by the Applicant known as a "dry joint prefabricated mold", widely used in the art and described in French patent No 2 396 620, for example. This mold is directly carried by the rails 1 and 2 in a position of use that conforms, with certain tolerances, to a specific position that will serve as a reference in the remainder of the description. Of course, any other mold for welding metal parts could be improved in accordance with the present invention and the person skilled in the art will easily be able to modify the arrangements to be described accordingly.

As the mold 10 shown is well known in itself in respect of its general characteristics, suffice to say that it is formed of three main components, namely two top half-molds or lateral shells 12 and 13 which are synmetrical to each other about the plane 3 in which they mate together, nesting together (in a manner that is not shown) to delimit the top of the imprint 9 on respective sides of the plane 3, and a bottom member or baseplate 14 delimiting the bottom of the imprint 9, the three components 12, 13, 14 being assembled together by mutual clamping means (not shown) and being sealed to each other, and to the rails 1 and 2, by felt gaskets 11 and luting agent.

In addition to respective halves of the imprint 9, symmetrical to each other about the plane 3 and about the plane 4, the shells 12 and 13 delimit towards the plane 3, at the top of the imprint 9, respective halves of a pouring bush 15 which widens in the upwards direction and opens onto the exterior of the mold 10 at the top, these halves of the pouring bush 15 being symmetrical to each other about the plane 3 and mutually symmetrical about the plane 4. Before making the weld, after fitting the mold 10 to the rails 1 and 2, the pouring bush 15 receives a device for pre-heating the imprint 9 and the areas of the rails 1 and 2 adjacent their respective end faces 6 and 7, this device being a burner or a torch 16 in this non-limiting example, after which it receives internally a nested part (not shown) symmetrical about both planes 3 and 4 and forming a chicane that subsequently obliges the molten metal produced by the aluminothermic action to flow, rather than directly along the axis 5 towards the imprint 9, into which the pouring bush 15 discharges downwardly, via lateral areas of the pouring bush 15, i.e. in practice via the areas of the pouring bush 15 at the greatest distance from the plane 3.

Furthermore, each shell 12 and 13 delimits internally, in areas farther away from the plane 3 than the corresponding respective half of the imprint 9 and of the pouring bush 15, a respective pipe 19, 20 up which air and then metal rise as the imprint 9 is filled during aluminothermic welding, which pipes 19 and 20 open at the bottom into a bottom area of the respective half of the imprint 9, i.e. near the baseplate 14, and towards the plane 3 in a top area of the respective half of the imprint 9.

As is also well known in itself, the lateral shells 12 and 13, the baseplate 14 and the chicane-forming part are made from a material combining sufficient resistance to the heating caused by welding with ease of destruction after welding, for example sand bonded with silicate and hardened with carbon dioxide.

The pipes 19 and 20 and the halves of the pouring bush 15 respectively defined by the lateral shell 12 and by the lateral shell 13 open at the top onto a respective plane top face 21, 22 of the latter. The faces 21 and 22 are symmetrical to each other about the place 3 and perpendicular to the plane 4, whereas relative to the plane 3 they form a dihedron at an angle other than 90°, for reasons of molding technology, but sufficiently close to 90° for them to be considered approximately coplanar. Similarly, although the two shells 12 and 13 are delimited in the direction away from the plane 3 by respective plane faces 24, 25 that are symmetrical to each other about the plane 3 and parallel to the latter, the two shells 12 and 13 are delimited in the direction away from the plane 4 by respective plane faces that are symmetrical to each other about the plane 4 and at an angle to the plane 3 different from 90° but sufficiently close to 90° for them to be considered as parallel to each other, as shown in FIG. 2, which shows the faces 26 and 27 delimiting the shell 12 in the direction away from the plane 4 and the faces 28 and 29 delimiting the shell 13 in the direction away from the plane 4; thus the faces 26 and 28 can be considered to be approximately coplanar to link together the faces 24 and 25 on one side of the plane 4 and the faces 27 and 29 can also be considered to be approximately coplanar to link together the faces 24 and 25 on the other side of the plane 4.

Note that, intersecting at the top the respective faces 21 and 22, as likewise the faces 24 and 25, the faces 26 and 27 of the shell 12 and the faces 28 and 29 of the shell 14 can advantageously have, where they intersect with the face 21 and with the face 22, respectively, in a respective area adjacent the plane 3, an area of weakness (no reference number) enabling a corundum passage to be formed when fitting the mold 10 to the rails 1, 2 to be welded. For example, using the areas of weakness corresponding to the faces 26 of the shell 12 and 28 of the shell 13, on the same side of the plane 4, the material of the shells 12 and 13 can be chipped away as far as the pouring bush 15 to form a corundum passage 34 leading from the pouring bush 15, at a level lower than that of the top face 23 of the mold 10, to the exterior of the mold with a uniform distribution on each side of the plane 3, so that when the imprint 9 and the pouring bush 15 have been filled with the metal produced by the aluminothermic reaction, the corundum can flow to a corundum recovery tank, not shown, laid on the rail 1 (on the same side of the plane 4 as the faces 26 and 28 of the shells 12 and 13).

All the arrangements that have just been described with reference to the mold 10 are known in themselves.

The mold 10 also has features in accordance with the present invention, described next.

To prevent mutual nesting of the two shells 12, 13 around the rails 1, 2 and the gap 8 if the latter has a dimension perpendicular to the plane 4 between the faces 6 and 7 less than a specific threshold corresponding to an optimum value for welding, each of the shells 12, 13 has fastened to the inside of the corresponding part of the imprint 9 a respective spacer member 17, 18 shaped to fit in the gap 8, at the level of the stems of the rails 1, 2, if the dimension in question of the gap 8 is greater than or equal to the predetermined threshold, and not to fit in the gap 8 if its dimension in question is less than this specific threshold, in which case it is kept out by coming into contact with the stems of the rails 1, 2.

Each spacer member 17, 18 is advantageously made in one piece from a material such as expanded polystyrene that is destroyed without producing residues likely to degrade the weld when heated to a specific temperature less than the melting point. of the rails 1 and 2 and preferably less than the specific pre-heating temperature to which the latter are heated prior to introduction of the molten filler metal into the imprint 9.

For fastening it to the corresponding shell 12, 13, each spacer member 17, 18 has a. respective base part 30, 31 with a shape closely complementary to that of the corresponding shell 12, 13 on the side towards the plane 3, in its areas nearest the plane 4, to delimit the imprint 9 at the level of the stems of the rails 1, 2;

this shape can vary within very wide limits and for this reason will not be specified further. This complementarity of shapes is preferably such as to assure fixing of the base part 30, 31 to the corresponding shell 12, 13 in a specific relative position by friction or forcible nesting of the base part 30, 31 in the shell 12, 13. In this specific position, which will be used as a reference for the remainder of the description of the spacer members 17, 18, the latter are respectively symmetrical about the plane 4 and mutually symmetrical about the plane 3, if it is assumed that a separation equal to the separation threshold between the faces 6 and 7 of the rails 1 and 2 has been complied with, and consequently has enabled the shells 12, 13 to be assembled together in a specific position around the rails 1 and 2 and the space 8, as shown in FIG. 2.

Referring to the relative position shown in FIG. 2, each of the base parts 30, 31 has on the side towards the plane 3 two plane shoulders 36, 37 and 38, 39, the two shoulders 36 and 37 on the base part 30 of the spacer member 17 being mutually coplanar, mutually symmetrical about the plane 4 and parallel to the plane 3 so as to bear respectively against the stem of the rail 1 and against the stem of the rail 2, at least approximately flat, on the same side of the plane 3 as the shell 12, and the two shoulders 38, 39 of the base part 31 of the spacer member 18 being coplanar, mutually symmetrical about the plane 4 and parallel to the plane 3, and bearing respectively against the stem of the rail 1 and against the stem of the rail 2, at least approximately flat, on the same side of the latter as the shell 13 when the two shells 12 and 13 are assembled together.

Furthermore, each spacer member 17, 18 carries a spacer part 32, 33 projecting towards the plane 3 relative to the two shoulders 36, 37 and 38, 39, its size being such that it can be inserted into the gap 8, so that the previously mentioned contact is established between the shoulders 36, 37, 38, 39 and the stem of a respective one of the rails 1, 2, only if the gap 8 has a dimension perpendicular to the plane 4 at least equal to the predetermined threshold.

To this end, seen in section on any plane perpendicular to the axis 5, each spacer part 32, 33 has an identical cross-section in the shape of a isosceles trapezium defined by two respective plane flanks 40, 41 and 42, 43 and by a respective plane front face 44, 45.

As FIG. 1 shows for the front face 44, the two front faces 44 and 45 are rectangular and parallel to the two shoulders 36, 37 and 38, 39 of the respective spacer member 17, 18 and project towards the plane 3 relative to these two shoulders, this projection being however to a distance such that there is no contact between the two front faces 44 and 45 which, although close to the plane 3 to which they are parallel, remain on the same side of the latter as the corresponding shell 12, 13.

In the upwards and downwards directions, i.e. parallel to the axis 5, this rectangular shape is defined by the junction of the front face 44, 45 with respective top and bottom faces of the corresponding spacer member 17, 18; these faces, e.g. the face 23, are plane, perpendicular to the axis 5 and delimit the combination of the two parts 30, 32, 31, 33 of the spacer members 17, 18 in question respectively upwards and downwards, including the shoulders 36, 37, 38, 39; they are advantageously cut from a longitudinal bar having a constant cross-section corresponding to the cross-section of the spacer members 17, 18 in any plane perpendicular to the axis 5, which enables particularly economic fabrication of the spacer members 17, 18.

In the direction away from the plane 4, the front face 44 is joined on one side to the shoulder 36 by the flank 40 and on the other side to the shoulder 37 by the flank 41; the front face 45 is joined or. one side to the shoulder 38 by the flank 42 and on the other side to the shoulder 39 by the flank 43; the two flanks 40 and 41 are mutually symmetrical about the plane 4 and the two flanks 42 and 43 are respectively symmetrical to the flanks 40 and 41 about the plane 3. The front face 44 is joined to the two flanks 40 and 41 along straight edges (no reference number) parallel to the axis 5, mutually symmetrical about the plane 4 and mutually separated, perpendicularly to the latter, by a distance less than the predetermined separation threshold between the end faces 6, 7 corresponding to an optimum value for welding; the same applies to the joining of the front face 45 to the two flanks 42 and 43. The two flanks 40 and 41 are also joined to the respective shoulders 36 and 37 along straight edges, not shown, parallel to the axis 5 and mutually symmetrical about the plane 4, the mutual spacing of these two edges perpendicularly to the plane 4 being greater than that between the edges where the flanks 40 and 41 join the front face 44, to be more precise equal to the predetermined separation threshold between the faces 6 and 7 if the material constituting the spacer member 17 is substantially incompressible and if the threshold in question is defined with practically no tolerance; the same applies to the joining of the flanks 42 and 43 to the respective shoulders 38 and 39 of the spacer member 18. However, if the separation threshold between the end faces 6 and 7 of the rails 1 and 2, optimal for the quality of the welding, is defined with a certain tolerance, the spacer members 17, 18 could instead be made from a material having a limited compressibility, which is the case with the expanded polystyrene material Previously referred to, and the front faces 44 and 45 have a dimension between the edges where they are joined to the corresponding flanks 40, 41, 42 and 43 equal to the lower limit value of the threshold and the mutual spacing of the edges where the flanks 40, 41 join the shoulders 36, 37 or the flanks 42, 43 join the shoulders 38, 39 is made equal to the maximum permissible value of this threshold; accordingly, if the threshold is 25±2 mm, which constitutes one non-limiting example of a permissible value in the case of aluminothermic welding of railway rails, the front faces 44, 45 have a dimension perpendicular to the plane 4 of 23 mm and the joins between the flanks 40, 41 and the shoulders 36, 37 and those between the flanks 42, 43 and the shoulder 38, 39 are mutually spaced by 27 mm in a direction perpendicular to the plane 4; the above figures are naturally given by way of non-limiting example only. Also by way of non-limiting example, the dimension of each spacer member 17, 18 between its top and bottom faces, such as the face 23, can be in the order of 50 mm, it being understood that these figures relate to the example of aluminothermic welding of railway rails of standard size, and that different figures could be adopted depending on the nature and the dimensions of the metal parts to be welded.

A person skilled in the art will readily understand that if the end faces 6, 7 of the rails 1, 2 comply with the separation threshold corresponding to an optimum for welding the spacer parts 32, 33 of the spacer member 17, 18 can be inserted into the space 8 and:

allow mutual assembly of the shells 12, 13, the conformation of which is such that they then mate together so that they are butted up against each other along the plane 3, above the rails 1, 2, to delimit the imprint 9 around the space 8 and the areas of the rails 1, 2 immediately adjoining their end faces 6, 7, and at the same time:

assure accurate positioning of these shells 12, 13, in particular of the part of the imprint 9 that they define, relative to the gap 8, i.e. accurate positioning in the lengthwise direction of the rails, i.e. in a direction perpendicular to the plane 4, and accurate positioning in orientation, i.e. such that a plane of symmetry (no reference number) specific to each of them coincides with the plane 4.

It is therefore certain not only that the end faces 6, 7 of the rails 1, 2 are not. too close together for the welding to be carried out but also that the molten filler metal subsequently poured into the imprint 9 through the pouring bush 15 will come into contact with the rails 2 and 3 under exactly the same conditions, in particular with exactly the same surface area of contact, and will cause localized heating of the rails 1, 2 under exactly the same conditions, which assures the homogeneity and therefore the quality of the welding.

This also assures safety since it guarantees that the gaskets such at the gasket 11 providing the seal between the shells 12, 13 and the rails 1, 2 do not infiltrate in any way the gap 8, which would entail the risk of allowing molten filler metal to leak out of the imprint 9, quite apart from any question of the quality of the welding.

To avoid such leaks, the baseplate 14, which closes the imprint 9 at the bottom, is preferably nested under the shells 12, 13 by means preventing any relative displacement in any direction perpendicular to the axis 5, i.e. any horizontal movement in the case of the orientation chosen by way of non-limiting example for the present description, it being understood that the fastening together of the baseplate 14 and the two shells 12, 13 is effected by exterior clamping means, not shown.

It will be remembered that the shells 12 and 13 mate with the two rails 1 and 2 only around the head, long the stem, on top of the flange and on the side of the latter, leaving the flange totally free at the bottom. Thus each shell 12, 13 is delimited at the bottom, between the imprint 9 and the face 24, 25 which delimits it in the direction away from the plane 3, by a bottom face 44, 45 which, in the immediate vicinity of the imprint 9, is plane and perpendicular to the plane 3 so as to be aligned and coplanar with the bottom face of the flange of the rails; in its part farther away from the imprint 9, it inclines downwardly in the direction away from the axis 3, remaining plane, to cooperate with a felt gasket, not shown, carried by the baseplate 14. Its general shape is that of a rectangular parallelpiped, defined by a rectangular plane bottom face 46 perpendicular to the plane 3, a rectangular plane top face 47 also perpendicular to the plane 3 and having a rectangular rim 63 for fixing the felt gasket previously referred to, not shown, and four plane edges joining together the two faces 46 and. 47, namely two edges 48, 49 perpendicular to the plane 3 and mutually symmetrical about the plane 4 if the baseplate 14 is correction positioned relative to the shells 12, 13, themselves assumed to be correctly positioned relative to the rails 1 and 2, these two edges 48 and 49 being parallel to the plane 4 apart from a slight convergence in the upwards direction, for reasons of fabrication technology, and two edges 50, 51 perpendicular to the plane 4 and, except for a slight convergence in the upwards direction, for the same fabrication reasons, mutually symmetrical about the plane 3 and approximately parallel to the latter.

In one preferred embodiment of the present invention, to assure nesting of the two shells 12, 13 on the baseplate 14, such as to assure the previously mentioned relative immobilization, the two edges 50, 51 are mutually spaced, in the direction perpendicular to the plane 3, by a distance less than that perpendicular to this plane between the faces 24 and 25 of the shells 12, 13 when assembled together, and each of these shells has, where its bottom face 44, 45 is joined to its face 24, 25 farthest away from the. plane 3, a downwardly projecting rim 52, 53 defining towards the plane 3 a respective plane shoulder 54, 55 that it at least approximately parallel to the plane 3; the two shoulders 54, 55 are mutually symmetrical relative to the latter and mutually spaced, perpendicularly to the latter, by a distance substantially equal to the distance perpendicular to the plane 3 between the edges 50 and 51, at least in the immediate vicinity of where they are joined to the top face 47 of the baseplate 14, so that the shoulders 54, 55 face the edges 50 and 51, respectively, with merely a functional clearance relative to the latter, when the bottom face 44, 45 of the shells 12 and 13 rests on the felt gasket carried by the rim 63 on the top face 47 of the baseplate 14, to provide immobilization against relative movement perpendicular to the plane 3. The edges 48, 49 of the baseplate 14 are mutually spaced, perpendicularly to the plane 4, by a distance greater than the distance perpendicular to this plane between the faces 26 and 27 of the shell 12 in the immediate vicinity of where they are joined to the face 24, and the faces 28 and 29 of the shell 13 in the immediate vicinity of where they are joined to the face 25 and the top face 47 of the baseplate 14 have a respective upwardly projecting stud 56, 57, 58, 59 attached to it at each of its four corners; the two studs 56 and 57 where the edge 50 is joined to the edges 48 and 49, respectively, are mutually symmetrical about the plane 4, and likewise the studs 58 and 59 where the edge 51 is joined to the edges 48 and 49, respectively, the studs 58 and 59 being additionally symmetrical to the studs 50 and 57, respectively, about the plane 3. Perpendicularly to this plane, the studs 58 and 59 are spaced from the studs 56 and 57 by a distance much greater than the corresponding dimension of the flanges of the rails 1, 2. Perpendicularly to the plane 4, the studs 56 and 58 are spaced from the studs 57 and 59, respectively, by a distance substantially equal to the distance perpendicular to the plane 4 between the faces 26 and 27 of the shell 12 in the immediate vicinity of where they are joined to the face 24 and the faces 28 and 29 of the shell 13 in the immediate vicinity of where they are joined to the face 25. Accordingly, the two shells 12 and 13 nest between the studs 56 and 58, on the one hand, and the studs 57 and 59, on the other hand, subject to compliance with a simple functional clearance, and this nesting provides immobilization against relative movement perpendicular to the plane 4, the faces 26 through 29 abutting in this direction against the studs 56 through 59, respectively.

This assures that the baseplate 14 is correctly positioned relative to the imprint 9 and consequently relative to the gap 8 provided that the shells 12, 13 are themselves correctly positioned relative to the latter by the spacer members 17 and 18.

This prevents all risk of incorrect positioning of the baseplate 14, likely to cause particularly dangerous leaks of molten filler metal.

For the weld to be homogeneous, not only is it necessary for the molten filler metal to enter into contact with the two rails 1, 2 to be welded under exactly the same conditions, but also, if the latter are pre-heated in the imprint 9 of the mold before introducing the molten filler metal into it, it is important for the two rails to be pre-heated under exactly the same conditions, i.e. for the heater device used for this purpose, namely the nozzle 68 of the burner 16 in this example, to be placed as strictly symmetrical relative to the planes 3, 4 as possible, and in particular along the axis 5, and preferably at a specific level above the rails 1, 2 in the case of a downwardly facing burner nozzle.

Complementary provisions are therefore made on the burner 16 and on the mold 1, one non-limiting example of which will now be described, it being understood that these provisions and their variants may be transposed to any type of pre-heater device.

In the preferred embodiment shown, these provisions are adapted to enable nesting of the burner with the mold after the latter is assembled around the ends of the rails 1, 2 to be welded, such nesting being particularly convenient to carry out, with all the necessary accuracy as regards the positioning of the burner inside the pouring bush, without slowing down the operation of extracting the burner after pre-heating, i.e. the casting of the molten filler metal between and around the pre-heated rails.

To this end, the mold 10 has externally, on respective opposite sides of the pouring bush 15, a nesting bearing surface 60, 61 opening onto its top face, comprising the top faces 21 and 22 of the shells 12, 13.

Half of each of the bearing surfaces 60, 61 is defined by one of the shells 12, 13 and overlaps symmetrically the plane 3, with the two bearing surfaces 60, 61 mutually symmetrical about the plane 4.

To be more precise, the two bearing surfaces 60, 61 have a respective plane back 62 parallel to and recessed towards the plane 4, half of which is in each of the faces 26 and 28 and half of which is in each of the faces 27 and 29. Each of these backs 62 therefore faces towards the exterior of the mold, in the direction away from the plane 4. The two backs 62 are joined at the top to the top faces 21, 22 of the shells 12, 13 and if the join is regarded as a straight edge, despite the fact that the top faces 21 and 22 are not strictly perpendicular to the plane 3, for the reasons of molding technology already mentioned, each of the backs 62 has the shape of an isosceles trapezium, wider at the top than at the bottom. This trapezoidal shape is defined by the joining of the back 62 to three plane shoulders perpendicular to the plane 4, namely a bottom shoulder 64, 65 perpendicular to the plane 3 and symmetrically overlapping the latter to define the shorter base of the isosceles trapezium, the longer base of which is defined by the joining of the back 62 to the top faces 21, 22 of the shells 12, 13, and two lateral shoulders 66, 67 mutually symmetrical about the plane 3 and diverging from the latter in the upwards direction, each of these lateral shoulders 66, 67 being joined at the bottom to the respective bottom shoulder 64, 65 and at the top to the top face 21, 22 of the corresponding shells 12, 13, respectively. The bottom shoulder 64 and the shoulders of the flanks 70 corresponding to the bearing surface 60 open onto the faces 26, 28, towards which the bearing surface 60 is therefore totally open, in the same way as it is totally open at the top, whereas the bottom shoulder 65 and the lateral shoulders 67 open onto the faces 27, 29 of the shells 12, 13, so that the bearing surface 61 is also totally open in the direction away from the plane 4, as well as in the upwards direction. Because the two bearing surfaces 60, 61 are identical, respectively symmetrical about the plane 3 and mutually symmetrical about the plane 4, the bottom shoulders 64, 65 are mutually coplanar and each lateral shoulder 67 is coplanar with a respective lateral shoulder 66.

It will be seen that the backs 62 of the two bearing surfaces 60, 61 totally encompass the areas of weakness provided for forming the corundum passage 34 so that, even when a passage of this kind has been formed, which is done before fitting the pre-heater burner, there remains between the channel 34 and the shoulders flanking the back 62, at the bottom and laterally, a strip of this back 62 which is sufficient to offer a counterpart to the nesting bearing surfaces attached to the burner, described next with reference to the position that they occupy when the burner 16 is installed by means of them on the mold 10. This position is also used as a reference for the outline description of the burner 16 shown, it being understood that there are many types of burner that can be used to pre-heat the end portions of railway rails to be welded and that a person skilled in the art will readily understand that, possibly subject to a few modifications that will be evident to any such person, the arrangements to be described now may be adopted independently of the type of burner.

In the example shown, the burner 16 includes a straight gas feed tube 69 disposed horizontally, perpendicularly to the plane 4, above the top face 21 of the shell 12, it being understood that because the bearing surfaces 60, 61 are identical and mutually symmetrical, an arrangement is equally possible in which the tube 69 is above the top face 22 of the shell 13, in a manner that is not shown. The tube 69 therefore has two ends on respective opposite sides of the plane 4, namely a closed end 70 on the same side of this plane as the faces 26 and 28 of the shells 12, 13 and an end 71 fitted with a gas inlet connector 72 facing the same way as the faces 27 and 29 of the shells 12, 13 relative to the plane 4 and adapted to face towards the other side of this plane if the tube 69 is placed above the top face 22 of the shell 13 instead of being placed above the top face 21 of the shell 12.

A gas injection nozzle 73 branches off the tube 69, discharging in the plane 3, towards the plane 4 and on the same side of the latter as the end 71 of the tube 69, inside a venturi 74 for aspirating air from the surrounding atmosphere. The venturi 74, having an axis perpendicular to the plane 4 and situated in the plane 3, is situated on the same side of the plane 4 as the end 71 of the tube 69 and decreases in size in the direction towards the plane 4, as far as where it is joined to a tube 75 having a straight section where it is joined to the venturi 74 that is coaxial with the latter and with the injector 73. Starting from this section, the tube 75 is bent 90° downwards to form another straight section with axis 5 extending downwardly into the pouring bush 15 and terminating above the gap 8 in the nozzle 68, passing to one side of the tube 69 to which the tube 75 is attached by any appropriate means.

On the same side as its end 71 relative to the plane 4 and relative to the section of the tube 75 which is disposed along the axis 5, the tube 69 has fastened to it a plate 76 bent at 90° so as to have a first plane area 77 perpendicular to the axis 5 fixed to the bottom of the tube 69, at a level above that of the top faces 21 and 22 of the shells 12, 13, and a second area 78 parallel to the plane 4, extending downwardly from the first area 77 and having at the bottom a trapezoidal shape substantially identical to that of the back 62 of one of the nesting bearing surfaces of the mold, in this example the nesting bearing surface 61 in which the area 78 of the plate 76 is engaged, being pressed flat against the bottom 62, towards the plane 4, against the shoulder 65 in the downward direction and against the shoulders 67 in the direction away from the plane 3; this locates the plate 76 relative to the mold 10 in the direction towards the plane 4, in the downwards direction and in the direction away from the plane 3, in a position corresponding, for the nozzle 68 and the section of the tube 75 inserted in the pouring bush 15, to a coaxial relationship with the axis 5, to a symmetrical relationship about the two planes 3 and 4 and to a predetermined level of the nozzle 68 relative to the rails 1 and 2 and to the gap 8 delimited by the end faces 6, 7 of the latter.

On the other side of the plane 4, in the immediate proximity of its other end 70, the tube 69 has attached to it a nut 79 having an axis 80 perpendicular to the plane 4, in the plane 3 and at a level between that of the bottom shoulders 64, 65 of the bearing surfaces 60, 61 and that of the top faces 21, 22 of the two shells 12, 13; for example, the axis 80 is at the same distance from the geometrical plane (no reference number) common to the two shoulders 64 and 65 and the intersection of the top faces 21 and 22 of the shells 12, 13 with the plane 4.

The nut 79 faces towards the bottom 62 of the bearing surface 60 when the part 78 of the plate 76 is engaged in the bearing surface 61 under the conditions described previously, i.e. pressed flat against the bottom 62 of the bearing surface 61, against its bottom shoulder 65 and its lateral shoulder 67, and when the nozzle 68 and the section of the tube 75 immediately adjacent the latter are disposed along the axis 5; in this position, the nut 79 complies with a spacing from the back 62 of the bearing surface 60 and, to be more precise, it is offset relative to the faces 26 and 28 of the shells 12 and 13 in the direction away from the plane 4; to this end, the nut 79 is offset from the area 78 of the plate 76, perpendicularly to the plane 4, by a distance perpendicular to the plane 4 greater than that between the backs 62 of the two bearing surfaces 60, 61.

The nut 79 carries internally and coaxially a screw 81 having to this end a screwthreaded shank with axis 80 engaged with the nut 79 and an operating head 82 attached to one end of this shank, on the opposite side of the nut 79 to the plane 4; by rotating the head 82 one way or the other relative to the nut 79, about the axis 80, the shank of the screw can be screwed into or out of the nut 79. Opposite the head 82 relative to the nut 79, i.e. between the latter and the plane 4, or to be more precise the bearing surface 60 in the example shown, the shank of the screw 81 carries, constrained to move with it in translation along the axis 80, prevented from moving perpendicular to that axis, but able to rotate relative to it about the latter, a plate 83 parallel to the plane 4 and having a trapezoidal shape symmetrical about the plane 3 identical to that of the back 62 of the bearing surface 60.

Accordingly, by unscrewing the screw 81 relative to the nut 79, the plate 83 can be positioned at a distance from the area 78 of the plate 76 greater than the distance mutually separating the backs 62 of the two bearing surfaces 60 and 61, so that the burner 15 can be lifted freely relative to the mold 10 if it is assumed that the area 78 of the plate 76 is initially pressed flat against the back 62 and the shoulders 65 and 67 of the bearing surface 61; in this way the burner 15 can also be moved freely into its position corresponding to this flat pressing engagement. When this has been achieved, by operating on the head 82 of the screw 81 the latter can be screwed into the nut 79, which moves the plate 83 towards the area 78 of the plate 76, along the axis 80, until the plate 83 is housed in the bearing surface 60, and pressed flat against the back 62 of the latter, on the one hand, and against the shoulders 64 and 66 flanking this back, on the other hand, in a position strictly symmetrical to that of the area 78 of the plate 76 about the plane 4, which immobilizes the burner 16 in a position in which its nozzle 68 and the section of the tube 75 adjacent its nozzle are disposed along the axis 5, which centers the nozzle 68 relative to the gap 8 between the end faces 6, 7 of the two rails 1, 2 to be welded and places the nozzle 68 at a specific level relative to the two rails 1, 2 so that the latter can be pre-heated under conditions that are not only strictly identical but also strictly specified. When the preheating has been completed, it is a simple matter to unscrew the screw 81 rapidly, i.e. to unclamp the mold 10 between the plate 83 and the area 78 of the plate 76, in order to lift out the burner 16 before placing the previously mentioned chicane-forming member in the pouring bush and pouring the molten filler metal into the pouring bush 15.

A person skilled in the art will easily understand that the arrangements just described merely constitute one nonlimiting embodiment of the present invention and that many modifications or variants of this embodiment can be put forward without departing from the scope of the present invention.

What is claimed is:

1. Welding mold for butt welding two metal parts having a specific mutual separation in order to define a gap between them, said mold comprising a plurality of mold members adapted to be assembled together about the two parts and forming, around said gap, a molding imprint adapted to receive a molten filler metal, at least one of said mold members including, inside the imprint, at least one spacer member shaped and sized so that it can be engaged in said gap if the two parts have a mutual separation at least equal to said specific mutual separation, in order to enable assembly of said mold members about the two parts in a specific relative position and so that it cannot be engaged in said gap if the two parts have a mutual separation less than said specific mutual separation, in order to prohibit the assembly of said mold members about the two parts in said specific relative position, wherein said spacer member is made from a material that degrades without producing residues that can degrade the weld at a specific temperature lower than the melting point of the parts.

2. Mold according to claim 1 wherein said specific temperature at which the spacer member is degraded is less than a specific temperature to which the parts are pre-heated inside the imprint prior to introduction of the molten filler metal into the imprint.

3. Mold according to claim 1 wherein said mold members include two lateral shells which are mutually symmetrical about a mutual mating plane adapted to coincide with a median plane common to the two parts when in said specific relative position and each of the lateral shells has one such spacer member.

4. Mold according to claim 1 wherein said mold members include at least one top member formed of two lateral shells mutually symmetrical about a mutual mating plane adapted to coincide with a median plane common to the two parts in said specific relative position, and at least one bottom member underlying the top member, and in that the at least one top member and the bottom member have means for mutual nesting in a specific relative position.

5. Mold according to claim 1 further comprising a pouring bush opening at the top onto the outside of the mold and at the bottom into the imprint and means for specifically positioning within the pouring bush a device for pre-heating the parts inside prior to the introduction of the molten filler metal into the imprint.

6. Mold according to claim 5 wherein the specific positioning means comprise, on respective opposite sides of the pouring bush, externally of the mold, a bearing surface with which a respective bearing surface of complementary shape on a pre-heater device nests downwardly.

7. Mold according to claim 6 wherein the nesting bearing surfaces on respective opposite sides of the pouring bush are identical, mutually symmetrical about a first plane and respectively symmetrical about a second plane perpendicular to the first plane, one of the first and second planes being adapted to coincide with a median plane common to the two parts in said specific relative position and the other of said first and second planes being adapted to coincide with a median plane of said gap in said specific relative position.

8. Mold according to claim 7 wherein each of the nesting bearing surfaces on respective opposite sides of the pouring bush has a flat back facing towards the outside of the mold and in the shape of an isosceles trapezium smaller at the bottom than at the top, the two backs being mutually parallel and overlapping the second plane, and shoulders flanking the back downwards and in a direction away from the second plane, on respective opposite sides of the second plane, whereas the back is open in the upwards direction.

9. Pre-heater device adapted to cooperate with a welding mold according to claim 8, including a heater member adapted to be engaged downwardly in the pouring bush and to be placed at the intersection of the first and second planes, it includes two plates each of which has a trapezoidal shape substantially identical to that of the back of a nesting bearing surface formed on the mold, and means for placing the two plates on respective opposite sides of the heater member, in a relative position such that they are mutually parallel, respectively symmetrical about a median plane of the heater member adapted to coincide with the second plane, mutually symmetrical about another median plane of the heater member adapted to coincide with the first plane, and mutually spaced by a distance substantially identical to the mutual spacing of the backs of the nesting bearing surfaces formed on the mold.

10. Device according to claim 9 wherein one of the plates is fastened to the heater member and the other plate is joined to the heater member by means for adjusting its separation from the first plate.

\* \* \* \* \*

UNITED STATES PATENT AND TRADEMARK OFFICE
CERTIFICATE OF CORRECTION

PATENT NO. : 6,152,349
DATED : November 28, 2000
INVENTOR(S) : Thuru

It is certified that error appears in the above-identified patent and that said Letters Patent is hereby corrected as shown below:

Column 15,
Line 13, after "inside", insert -- the imprint --.

Signed and Sealed this

Fourteenth Day of May, 2002

Attest:

Attesting Officer

JAMES E. ROGAN
Director of the United States Patent and Trademark Office